United States Patent Office 3,481,136
Patented Dec. 2, 1969

3,481,136
PROCESS FOR PRODUCING POLYESTER YARN
William D. Timmons, Jr., and Walter C. Worsham, Charlotte, N.C., assignors to Celanese Corporation, New York, N.Y., a corporation of Delaware and Fiber Industries, Inc., New York, N.Y., a corporation of Delaware
Filed Dec. 11, 1967, Ser. No. 689,689
Int. Cl. D02g 3/36, 3/02; D01d 11/06
U.S. Cl. 57—164
9 Claims

ABSTRACT OF THE DISCLOSURE

A method for the preparation of high strength polyester tire cord by producing an underdrawn polyester yarn, plying to produce a cord and then accomplishing a final draw in a tire cord coating operation employing substantial cord tensions.

---

This invention relates to a process for the preparation of polyester yarn, and more specifically, to an improved process for the preparation of high tenacity polyester tire cord wherein tenacity is increased as a result of a novel drawing operation.

Thermoplastic synthetic yarns, such as polyester yarns, are conventionally marketed in a fully drawn configuration; that is to say, the yarns are drawn to their maximum tenacity, for a preselected elongation, before being employed in final manufacturing operations such as for example, knitting, weaving or formation into fiber reinforced rubber goods products such as for instance, conveyor belts, V-belts, bridge pads, diaphragms, automotive tires and the like. Drawing operations, however, commonly involve the fiber being subjected to at least some heat treatment, the polymer of the fiber frequently undergoing a loss in tenacity when subjected to such elevated temperatures for extended periods of time. In certain manufacturing operations, and particularly in the manufacture of fiber reinforced rubber goods, the fiber reinforcing component frequently undergoes a heat and a tensioning operation similar to that experienced in the yarn drawing operations commonly employed by textile manufacturers. Illustrative of the type of process referred to is the tensioning of tire cord simultaneous to coating the cord with an adhesive agent such as will render the cord amenable to being adhered to rubber. In such adhesive coating operations the coated tire cord is commonly subjected to heating operations in order to quickly cure the coating on the cord. Also illustrative of the high temperature tensioning operations to which fiber reinforced rubber goods are frequently subjected is the molding operation to which fabric laminated to green rubber is subjected in the formation of the tire casing. In the formation of the tire casing, a rubberized fabric is forced against the walls of a casing mold simultaneous to being subjected to temperatures sufficient to cure the green rubber, the temperatures and pressures frequently being sufficient to stretch the fibers making up the fabric employed as a reinforcing member.

It is therefore an object of this invention to prepare polyester yarns which can be processed into cords of improved strength.

It is another object of this invention to provide a process for the preparation of polyester fibers wherein heat degradative processing conditions are minimized.

It is still another object of this invention to provide a process for the preparation of polyester fibers wherein at least some of the drawing of the polyester fibers is not obtained in a filament forming operation.

In accordance with this invention, it has now been discovered that high strength polyester fibers may be obtained by producing underdrawn polyester fibers and then obtaining final drawing of the polyester fibers in a manufacturing operation, not primarily associated with filament forming, wherein the fibers are subjected to high tensions and preferably high tensions and elevated temperatures. The polyester fiber is preferably a polyester tire cord which is made from underdrawn yarn, the cord being subsequently subjected to high temperatures and high tensions as a result of a tire cord adhesive coating operation.

Processing advantages are obtained with any underdrawn polyester yarn; however, it is preferred that the underdrawn yarn be a yarn which has been subjected to partial cold-drawing operations as opposed to hot-drawing operations. For purposes of this invention, the term "cold-drawing" may be defined as drawing at yarn exposure temperatures such that the small angle X-ray diffraction pattern gives an indeterminate long period spacing. Alternatively, "hot-drawing" may be defined as drawing at yarn exposure temperatures such that the small angle X-ray diffraction pattern gives a well defined long period spacing. X-ray photographs employed in the measurement of long period spacing are taken using nickel-filtered CuK α radiation from a generator operated at 40 kv. and 17 ma. The distance between the yarn sample and the film should be 29 cm. at an exposure time of 24 hours. Underdrawing can be defined as the process wherein the draw ratio is such that the drawn yarn birefringence has a value that is lower (up to 30% lower) than the maximum drawn yarn birefringence that can be obtained using the same drawing techniques.

A better understanding of the invention may be had from the drawings wherein.

Figure 1:
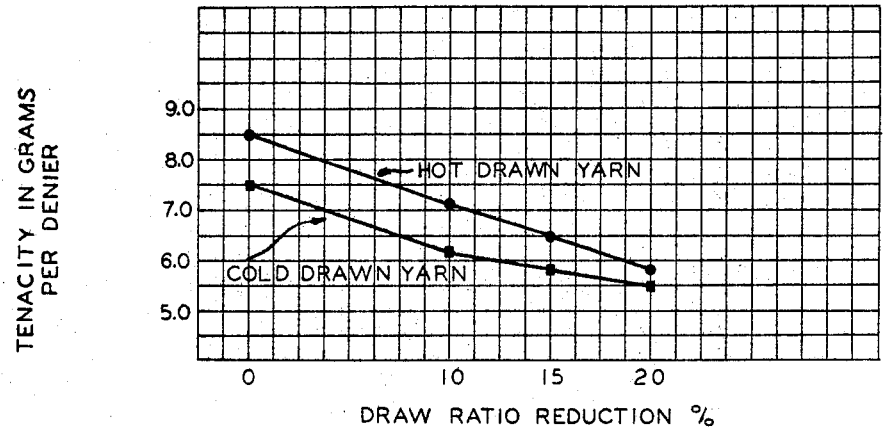
FIG. 1 is a graph plotting tenacity in grams per denier against percent draw ratio reduction for yarns which have been subjected to partial drawing by hot drawing conditions and by cold drawing conditions.

The data employed in the preparation of a graph of FIG. 1 is set forth in the following table designated as Table I.

Figure 2:
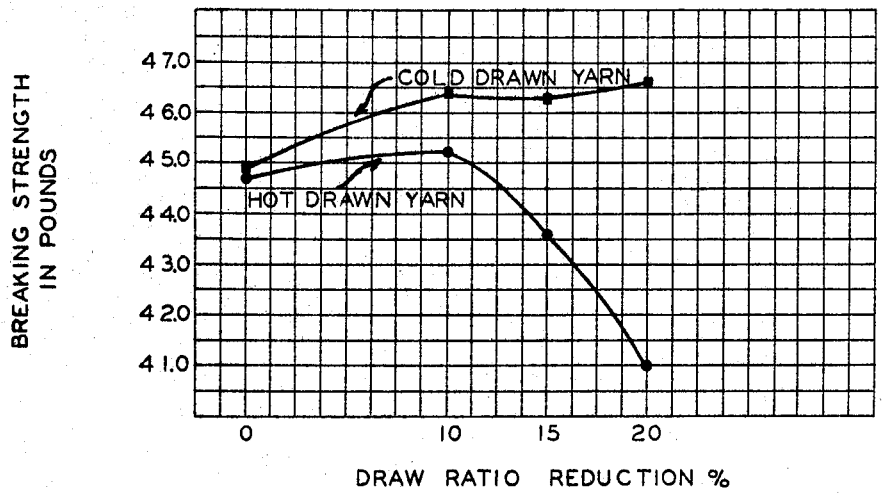
FIG. 2 is a graph plotting breaking strength in pounds against percent draw ratio reduction for processed tire cord obtained from the underdrawn yarns of FIG. 1.

The data temployed in the preparation of the graph set forth in FIG. 2 is set forth in the following table designated as Table II.

TABLE I.—UNTREATED YARN PROPERTIES

| | Draw Ratio Reduction, Percent | Tenacity, g./d. | | Elongation At Break, Percent | |
|---|---|---|---|---|---|
| | | Hot | Cold | Hot | Cold |
| Draw Ratio: | | | | | |
| 5.148 | 0 | 8.5 | 7.5 | 11.5 | 9.2 |
| 4.660 | 10 | 7.1 | 6.2 | 17.1 | 13.7 |
| 4.452 | 15 | 6.5 | 5.8 | 18.3 | 16.8 |
| 4.276 | 20 | 5.8 | 5.4 | 18.2 | 19.4 |

TABLE II.—PROCESSED CORD PROPERTIES

| | ΔDraw Ratio Reduction, Percent | Breaking Strength, lbs. | | Tenacity, g./d.[1] | | Elongation At Break, Percent | |
|---|---|---|---|---|---|---|---|
| | | Hot | Cold | Hot | Cold | Hot | Cold |
| Draw Ratio: | | | | | | | |
| 5.148 | 0 | 44.7 | 44.8 | 5.5 | 5.5 | 16.1 | 16.9 |
| 4.661 | 10 | 45.3 | 46.4 | 5.5 | 5.7 | 17.0 | 19.1 |
| 4.452 | 15 | 43.6 | 46.3 | 5.2 | 5.6 | 15.3 | 17.5 |
| 4.276 | 20 | 41.0 | 46.6 | 4.8 | 5.6 | 13.3 | 18.3 |

[1] Not corrected for adhesive coating in processed cord.

As can be seen from the figures and the corresponding tables, substantial improvements are obtained in breaking strength by employing underdrawn polyester cord in conventional tire manufacturing operations wherein the yarn is conventionally subjected to heat and tensioning operations in the yarn adhesive coating operation.

As can be seen in FIG. 1, cold partial drawing gives inferior yarns compared to hot drawn yarns. However, in FIG. 2, cords made from the cold drawn, inferior strength yarns, gain strength during processing and are superior to cords made from hot underdrawn yarns.

The following specific examples are given for purposes of illustration and should not be considered as limiting the spirit or scope of this invention:

Example I

A paste of ethylene glycol and terephthalic acid with a mole ratio of 1.6 moles of ethylene glycol to 1 mole to terephthalic acid is heated under about 50 p.s.i.g. in the presence of an antimony catalyst until the mixture is about 90% esterified. The prepolymer is transferred continuously to another vessel in which the pressure is reduced to about 1 mm. of Hg and heated to about 285° C. until an I.V. of 0.95 deciliter/gram as measured in o-chlorophenol at 25° C. is obtained.

The molten polyester is transferred continuously to a spinning machine where the polymer is melt spun at 300° C., using a conventional sand pack, through a spinneret having 192 holes, with a hole diameter of 12 mils. Directly below the spinneret the extruded filaments pass through a vertical heated shroud 22 inches in length which retards cooling of the filaments for that distance. The nominal temperature of the shroud is 230° C.

The filaments then pass over a finish roll where a lubricating finish is applied, then to a heated feed roll operating at a speed of 736 feet per minute and a temperature of 105° C. From the feed roll the threadline passes around a first draw roll at 115° C. and then to a second draw roll operating at 180° C. The speeds of the draw rolls are adjusted to draw the yarns 6.23 times their undrawn length. The threadline then passes to a conventional wind-up.

The 1330 denier yarn produced is found to have a tenacity of 8.9 grams per denier and an elongation at break of 11.6%.

A tire cord of 1300/3 construction is prepared by twisting the yarn prepared above 8.0 turns per inch Z in the singles, then plying three ends and twisting the plied yarn 8.0 turns per inch S. The cord is then passed into a Litzler Computreator where it is dipped in an adhesive and subjected to a three zone treatment as follows:

| | | | |
|---|---|---|---|
| Zone 1 | 350° F. | 0% stretch | 130 sec. |
| Zone 2 | 450° F. | 17% stretch | 50 sec. |
| Zone 3 | 465° F. | −1% stretch | 40 sec. |

The cord is found to have physical properties as follows:

| | |
|---|---|
| Breaking strength _____pound__ | 58.5 |
| Elongation at break _____percent__ | 15.5 |
| Denier (not corrected for amount of dip)_____ | 4658 |
| Twist cable _____tension per inch__ | 7.9 |
| LASE 5% (load/in pounds to produce 5% elongation) | 21.7 |
| Breaking energy (inch pounds per inch)_____ | 48.5 |
| Strength retention _____percent__ | 86 |
| Free shrinkage (in air at 320° F.) _____do____ | 8.3 |
| Shrinkage force in pounds (in air at 320° F.)____ | 2.34 |

Example II

The procedure of Example I is repeated except that the heat is turned off in the second stage draw and the draw rolls are operated so as to produce a draw ratio of 5.23:1. The greige yarn has a denier of 1543, a breaking strength of 18.3 pounds, an elongation at the break of 13.2%, and a tenacity of 5.37 grams per denier. A greige cord is prepared having a three ply construction with 9.3 turns per inch twist in the singles and 9.4 turns per inch cable twist. The cord is found to have a breaking strength of 52.6 pounds, a tenacity of 4.4 grams per denier and an elongation at the break of 31.6%. The cord is then passed into a Litzler Computreator where it is dipped in an adhesive and "hot stretched" in three zones as follows:

| | | | |
|---|---|---|---|
| Zone 1 | 300° F. | 0% stretch | 130 sec. |
| Zone 2 | 450° F. | 17% stretch | 50 sec. |
| Zone 3 | 465° F. | −1% stretch | 40 sec. |

The treated cord is found to have physical properties as follows:

| | |
|---|---|
| Breaking strength _____pound__ | 61.7 |
| Elongation at break _____percent__ | 17.5 |
| Denier (not corrected for coating pickup)_____ | 4959 |
| Twist cable _____tension per inch__ | 8.2 |
| LASE 5% (load in pounds to produce 5% elongation) | 28.1 |
| Breaking energy inch pounds per inch_____ | 69.9 |
| Strength retention _____percent__ | 117 |
| Free shrinkage (in air at 320° F.) _____do____ | 10.9 |
| Shrinkage force pounds (in air at 320° F.) _____ | 4.40 |

Example III

The procedure of Example I is repeated except that the second stage draw is heated to 180° C. and the draw rolls are operated so as to produce a draw ratio of 5.23:1. The greige yarn has a denier of 1535, a breaking strength of 20.1 pounds, an elongation at the break of 15.3%, and a tenacity of 5.94 grams per denier. A greige cord is prepared having a three ply construction with 9.4 turns per inch twist in the singles and 9.4 turns per inch cable twist. The cord is found to have a breaking strength of 56 pounds, a tenacity of 4.4 grams per denier and elongation at the break of 31.9%. The cord is then passed into a Litzler Computreator where it is dipped in an adhesive and "hot stretched" in three zones as follows:

| | | | |
|---|---|---|---|
| Zone 1 | 300° F. | 0% stretch | 130 sec. |
| Zone 2 | 450° F. | 17% stretch | 50 sec. |
| Zone 3 | 465° F. | −1% stretch | 40 sec. |

The cord is found to have physical properties as follows:

| | |
|---|---|
| Breaking strength _____lb__ | 59.9 |
| Elongation at break _____percent__ | 16.3 |
| Denier (not corrected for coating pick-up) _____ | 4884 |
| Twist cable _____t.p.i__ | 8.1 |
| LASE, 5% (load in pounds to produce 5% elongation) | 28.3 |
| Breaking energy (inch pounds per inch) _____ | 62.3 |
| Strength retention _____percent__ | 107 |
| Free shrinkage (in air at 320° F.) _____do____ | 10.8 |
| Shrinkage force pounds (in air at 320° F.) _____ | 4.38 |

Example IV

Molten polymer prepared by the method given in Example I is delivered to a spinning head where it is melt spun at 300° C. using a conventional sand pack, through a spinneret having 96 holes with a hole diameter of 18 mil. The extruded filaments are hot air quenched then passed over a lubricating finish roll and guided to a conventional wind-up unit.

The spun yarn packages are transferred to a draw-twister. Two ends are plied, then passed over a predraw roll to a feed roll operating at 100 feet per minute. After leaving the feed roll the yarn passes over a hot plate 9″ long and 1″ wide. The plate is heated to 225° C. The yarn then passes over a draw roll operating at a speed sufficient to draw the yarns 5.15 times their length; then finally to a conventional wind-up unit.

Yarn prepared by this method is found to have the following properties:

| | |
|---|---|
| Denier | 1029 |
| Breaking strength lbs | 19.4 |
| Tenacity g./d | 8.6 |
| Elongation at break percent | 10.8 |

The above yarn is 3 plied and twisted into cord and is found to have the following properties:

| | |
|---|---|
| Twist—singles t.p.i | 9.6 |
| Twist—cable t.p.i | 9.0 |
| Denier | 3512 |
| Breaking strength lbs | 49.4 |
| Tenacity g./d | 6.4 |
| Elongation at break percent | 17.3 |

The above cord is ahesive treated in a Litzler Computreator in three zones as follows:

| | | | |
|---|---|---|---|
| Zone 1 | 300° F. | 0% stretch | 130 sec. |
| Zone 2 | 450° F. | ----do---- | 50 sec. |
| Zone 3 | 465° F. | −1% stretch | 40 sec. |

Cord thus treated is found to have properties as follows:

| | |
|---|---|
| Denier (not corrected for coated pickup) | 3868 |
| Twist-cable t.p.i | 9.1 |
| Breaking strength lbs | 45.0 |
| Elongation at break percent | 15.1 |

Example V

The process of Example IV is repeated except that a draw ratio of 4.28 to 1 is employed.

Yarn prepared by this method is found to have the following properties:

| | |
|---|---|
| Denier | 1210 |
| Breaking strength lbs | 16.7 |
| Tenacity g./d | 6.28 |
| Elongation at break percent | 18.6 |

The above yarn is 3-plied and twisted into cord and is found to have the following properties:

| | |
|---|---|
| Twist—singles | 10.8 |
| Twist—cable | 10.7 |
| Denier | 4247 |
| Breaking strength | 46.3 |
| Tenacity | 4.94 |
| Elongation at break | 34.6 |

The above cord is adhesive heated in a Litzler Computreator in three zones as follows:

| | | | |
|---|---|---|---|
| Zone 1 | 300° F. | 0% stretch | 130 sec. |
| Zone 2 | 465° F. | 20% stretch | 50 sec. |
| Zone 3 | 465° F. | −1% stretch | 40 sec. |

The cord thus treated is found to have properties as follows:

| | |
|---|---|
| Denier (not corrected for coated pickup) | 3859 |
| Twist—cable | 8.9 |
| Breaking strength lbs | 45.9 |
| Elongation at break percent | 13.6 |

Example VI

The process of Example V is repeated except that the hot plate employed in the drawing operation is at ambient temperatures.

Yarn prepared by this method is found to have the following properties:

| | |
|---|---|
| Denier | 1213 |
| Breaking strength | 14.5 |
| Tenacity g./d | 5.40 |
| Elongation at break percent | 17.2 |

The above yarn is 3-plied and twisted into cord and is found to have the following properties:

| | |
|---|---|
| Twist—singles | 11.0 |
| Twist—cable | 10.7 |
| Denier | 4305 |
| Breaking strength | 40.4 |
| Tenacity | 4.26 |
| Elongation at break | 31.2 |

The above cord is adhesive treated in a Litzler Computreator in three zones as follows:

| | | | |
|---|---|---|---|
| Zone 1 | 300° F. | 0% stretch | 130 sec. |
| Zone 2 | 465° F. | 20% stretch | 50 sec. |
| Zone 3 | 465° F. | −1% stretch | 40 sec. |

The cord thus treated is found to have properties as follows:

| | |
|---|---|
| Denier (not corrected for coated pickup) | 3876 |
| Twist—cable | 9.1 |
| Breaking strength lbs | 47.7 |
| Elongation at break percent | 16.1 |

While a wide variety of yarn tensioning devices may be employed to treat the cords prepared from the underdrawn yarn of this invention, it is preferred that the tensioning device be a unitary saturation and tension drying apparatus suitable for use with hydrophobic textile materials. Apparatus of this type may consist of a dip section, a plurality of hot stretch or tension zones and windup cabinets. The hot stretch zones may apply cord tensions of from 1 to 20 pounds the tensions being uniformly maintained by floating pulleys. Simultaneously, cords are exposed to temperatures up to and including 500° F. to achieve heat setting or orientation of the cord. Apparatus of this type is manufactured by C. A. Litzler Co., Inc. of Cleveland, Ohio.

As can be seen from the examples, substantial improvements are obtained in breaking strength by employing underdrawn polyester cord in the preparation of tire cord. The examples further illustrate that cords made from cold underdrawn yarns gain strength and are superior to cords made from hot underdrawn yarns, although initially the hot underdrawn yarns have greater strength than the cold underdrawn yarns.

What is claimed is:

1. A process for the preparation of high strength polyester yarn said process comprising producing an underdrawn polyester yarn and then accomplishing a final draw in a coating operation wherein tensions are primarily employed to control tenacity and elongation at break.

2. The process of claim 1 wherein said polyester yarn is polyester tire cord yarn.

3. The process of claim 1 wherein said underdrawn yarn is underdrawn in a cold drawing operation.

4. The process of claim 1 wherein said final draw tensions are up to 2 grams per denier.

5. The process of claim 1 wherein said final draw tensions are accompanied by temperatures of up to 500° F., preferably below 475° F.

6. A process for the preparation of high strength polyester tire cord, said process comprising producing an underdrawn polyester yarn, twisting said yarn, plying said yarn to produce a cord, coating said cord with an adhesive composition at any point prior to final tensioning and then subjecting said coated tire cord to a heat and tensioning operation.

7. The process of claim 6 wherein heats of up to 500° F. are employed.

8. The process of claim 6 wherein said tensioning operation employs tensions of up to 2 grams per denier based on griege cord denier.

9. The process of claim 6 wherein said underdrawn polyester yarn is produced by a cold drawing operation.

(References on following page)

References Cited
UNITED STATES PATENTS

| | | | |
|---|---|---|---|
| 2,846,752 | 8/1958 | Lessig | 28—75 XR |
| 2,938,823 | 5/1960 | Salem et al. | 28—74 XR |
| 3,050,820 | 8/1962 | Pamm | 28—75 |
| 3,091,015 | 5/1963 | Zimmerman | 28—72 |
| 3,387,996 | 6/1968 | Tolliver | 117—138.8 |

MERVIN STEIN, Primary Examiner

WERNER H. SCHROEDER, Assistant Examiner

U.S. Cl. X.R.

28—75; 57—157; 117—7; 264—290

/ PO-1050
(5/69)

UNITED STATES PATENT OFFICE
CERTIFICATE OF CORRECTION

Patent No. 3,481,136      Dated    December 2, 1969

Inventor(s) W.D. Timmons et al

It is certified that error appears in the above-identified patent and that said Letters Patent are hereby corrected as shown below:

Column 2, line 47, "templyed" should read "employed"

Column 3, line 51, "17% " should read "0%"

Column 3, line 59, "tension" should read "turns"

Column 4, line 18, "tension" should read "turns"

Column 5, line 16, "ahesive" should read "adhesive"

Column 5, line 19, "450°F" should read "465°F"

SIGNED AND
SEALED
AUG 18 1970

(SEAL)
Attest:

Edward M. Fletcher, Jr.
Attesting Officer

WILLIAM E. SCHUYLER, JR.
Commissioner of Patents